US007497456B2

(12) United States Patent
Willems et al.

(10) Patent No.: US 7,497,456 B2
(45) Date of Patent: Mar. 3, 2009

(54) WHEELCHAIR PUSHRIM

(76) Inventors: Christopher J. Willems, 345 W. Mountain Sky Ave., Phoenix, AZ (US) 85045; Mark Baldwin, 2309 N. 81st Pl., Scottsdale, AZ (US) 85267; Michael L. Boninger, 6451 Monitor St., Pittsburgh, AZ (US) 15217; Rory A. Cooper, 79 Kaufman Rd., Gibsonia, PA (US) 15044

( * ) Notice: Subject to any disclaimer, the term of this patent is extended or adjusted under 35 U.S.C. 154(b) by 726 days.

(21) Appl. No.: 10/697,404

(22) Filed: Oct. 29, 2003

(65) Prior Publication Data

US 2004/0103745 A1 Jun. 3, 2004

Related U.S. Application Data

(60) Provisional application No. 60/422,458, filed on Oct. 30, 2002, provisional application No. 60/422,459, filed on Oct. 30, 2002, provisional application No. 60/468,920, filed on May 8, 2003, provisional application No. 60/468,921, filed on May 8, 2003.

(51) Int. Cl.
*B62M 1/14* (2006.01)

(52) U.S. Cl. ................................ 280/304.1; 280/250.1

(58) Field of Classification Search ............. 280/250.1, 280/304.1; 74/552
See application file for complete search history.

(56) References Cited

U.S. PATENT DOCUMENTS

| | | | | |
|---|---|---|---|---|
| 4,366,964 | A * | 1/1983 | Farey et al. | 280/250.1 |
| 5,160,156 | A * | 11/1992 | Mendon | 280/250.1 |
| 5,306,035 | A * | 4/1994 | Counts | 280/250.1 |
| 5,927,739 | A * | 7/1999 | Evling | 280/250.1 |
| 5,938,184 | A * | 8/1999 | DeSouza | 256/19 |
| 6,120,047 | A | 9/2000 | Axelson et al. | |
| 6,241,268 | B1 * | 6/2001 | Niklasson | 280/250.1 |
| 6,276,705 | B1 | 8/2001 | Baldwin et al. | |

* cited by examiner

*Primary Examiner*—Tony H. Winner
(74) *Attorney, Agent, or Firm*—Etherton Law Group, LLC; Sandra L. Etherton; Benjamin D. Tietgen

(57) ABSTRACT

A pushrim with increased surface area and an insert between the wheel and the pushrim. In the preferred embodiment, the cross-section of the pushrim is an elongated circle and the insert is a concave trough made of an elastic material which compressibly fits between the wheel and the rim for convenient installation. Improved pushing is provided by texturing the surface of the insert to provide increased friction. Improved braking is provided by providing a smoother and wider surface on the pushrim.

5 Claims, 10 Drawing Sheets

100

182
A
1/3
190
M
112
112
B
184
102
N

100

Y
404
400
406
408
402
X

WHEELCHAIR PUSHRIM

CROSS-REFERENCE TO RELATED APPLICATIONS

The present application claims priority to four related U.S. Provisional Patent Applications No. 60/422,458, filed Oct. 30, 2002; No. 60/422,459, filed Oct. 30, 2002; No. 60/468,920, filed May 8, 2003; and No. 60/468,921, filed May 8, 2003.

FIELD OF INVENTION

This invention relates to wheelchairs and more particularly to wheelchairs with an improved pushrim assembly.

BACKGROUND

The number of people in the world relying on manual wheelchairs for primary mobility has grown significantly in the past few decades and is approximated to be near two million in the United States alone. Unfortunately, traditional wheelchair pushrims have some disadvantages, including that they may cause physical injury to users, make pushing difficult, are unnecessarily heavy and difficult to install, vibrate uncomfortably, provide poor grip, and make braking painful on the hands. For example, the pushrims on traditional wheelchairs leave a gap between the wheel and the pushrim. Occasionally, body parts such as the wheelchair user's thumbs can slip into the gap, causing the thumbs to hit the wheel and spokes, resulting in injury to the user. Use of traditional pushrims can also result in long-term injury to the shoulders, hands, and wrists. It should be noted that the terms "pushrim" and "handrim" are used interchangeably in the field.

Secondary injuries such as carpal tunnel syndrome (CTS) are prevalent in manual wheelchair users with some studies finding up to 63% prevalence (Aljure, et al, "Carpel Tunnel Syndrome in Paraplegic Patients" Paraplegia 23; International Medical Society of Paraplegia (1985)). Nonetheless, users must use their arms in almost every daily activity and the option of a power wheelchair to prevent overuse injuries is often not economically feasible and undesirable for other reasons. Although there are several CTS-preventative propulsion devices commercially available (for example, add-on lever crank devices), the high prevalence of injury remains. Further, the best clinical solutions to relieve some of the injuries leave individuals unable to self-propel for extended periods of time. For example, the best resolution to CTS, carpal tunnel release surgery, often leaves an individual unable to self-propel or work for weeks and some times months. Thus, because of the limited options available, most manual wheelchair users ignore pain and trauma to their hands and arms during propulsion and continue the everyday activities, regardless of the risk of long-term harm. These phenomena have prompted research establishing a nexus between wheelchair propulsion biomechanics and highly prevalent secondary injuries.

In studies investigating secondary upper extremity injuries, the high prevalence of injuries has been attributed in part to overuse of the arms during daily wheelchair propulsion. Many researchers believe the inefficient transmission of power from the hand to the pushrim is a factor that contributes to nerve dysfunction in the upper extremities. Several studies on CTS in the able-bodied working population have found that long-term exposure to high repetitious forces to the hand and wrist can cause CTS (Silverstein et al, "Occupational Factors and Carpal Tunnel Syndrome" American Journal of Industrial Medicine; Vol. 11 (1987)). Recent studies on wheelchair propulsion biomechanics relate CTS in manual wheelchair users to higher propulsion forces applied to the pushrim and to greater stroke frequency during wheelchair propulsion (Baldwin et al "A Relationship between Pushrim Kinetics and Median Nerve Dysfunction).

Unfortunately, the tube diameter of standard pushrims is too small to allow complete grip between the palm of the hand and the fingers. The hand contacts only a small area of the surface of the rim, therefore lacking the friction to provide effective pushing grip. This creates a number of problems. First, it reduces the contact area between the hand and the pushrim, which increases the pressure on the contact points of the hand, and increases the forces transmitted to the delicate structures of the hand. Second, the inability to grip the pushrim with the entire palm and fingers reduces the mechanical efficiency by recruiting muscles for stabilization on the rim instead of delivering power to the wheelchair. Thus, the decreased mechanical efficiency and increased forces while using standard pushrims may contribute to developing secondary injuries like CTS. A wheelchair pushrim system capable of reduced injury risk, increased ease of pushing and installation, lighter weight, increased pushing friction, and decreased braking friction, would be highly desirable.

The inventors of the present application patented an improved pushrim, described in U.S. Pat. No. 6,276,705. That pushrim added a second tube located concentrically inside the first tube so that there would be additional surface area, namely the ring along the second tube, for the hand to contact, thereby increasing mechanical efficiency. The patent also describes an S-shaped trough attached to the upper surface of the first tube. While a genuine improvement over existing technology, the assembly suffers the disadvantages of being complicated to assemble and adding weight to the rim assembly.

A primary object and feature of the present invention is to provide a wheelchair pushrim system better contoured to a wheelchair user's hand. Another object of the present invention is to provide increased friction for improved pushing. Yet another object is to provide a wheelchair rim system that is lighter weight and is easier to assemble than those in the prior art. Another object of the present invention is to provide a decreased friction surface for more comfortable braking. Another object of the present invention is to provide a system that will help prevent injuries to fingers, hands, arms, and shoulders. Another object of the present invention is to provide a system that is efficient and requires reduced time, money, and energy. Other objects and features of this invention will become apparent with reference to the following descriptions.

SUMMARY OF THE INVENTION

The present wheelchair pushrim system utilizes a pushrim with increased surface area and an insert between the wheel and the pushrim. In the preferred embodiment, the cross-section of the pushrim is an elongated circle and the insert is a concave trough made of an elastic material which compressibly fits between the wheel and the rim for convenient installation. Improved pushing is provided by texturing the surface of the insert to provide increased friction. Improved braking is provided by providing a smoother and wider surface on the pushrim.

DETAILED DESCRIPTION OF THE INVENTION

Figure 1:
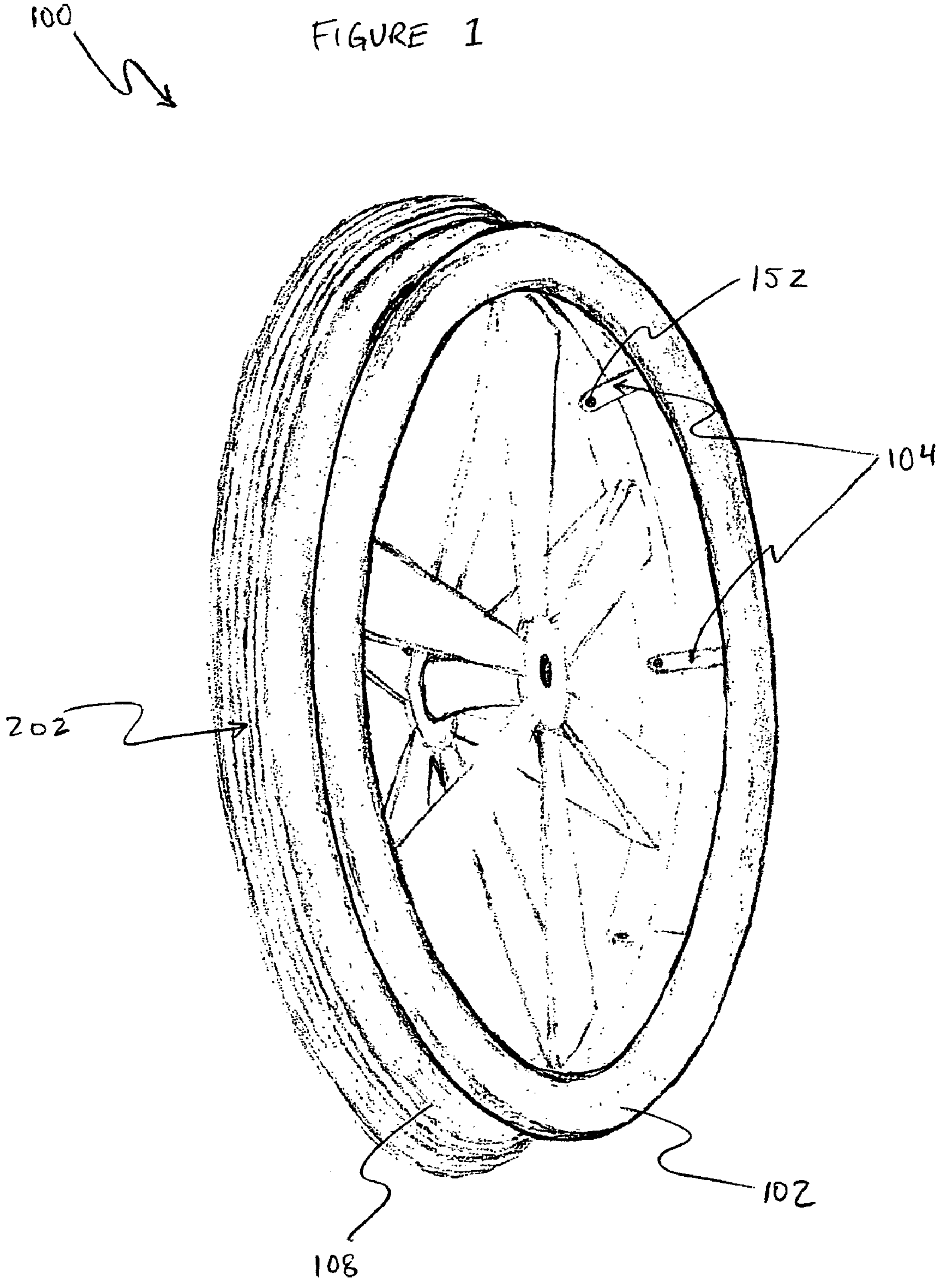
FIG. 1 is a perspective view of the wheelchair pushrim system according to a preferred embodiment of the present invention.
Figure 2:
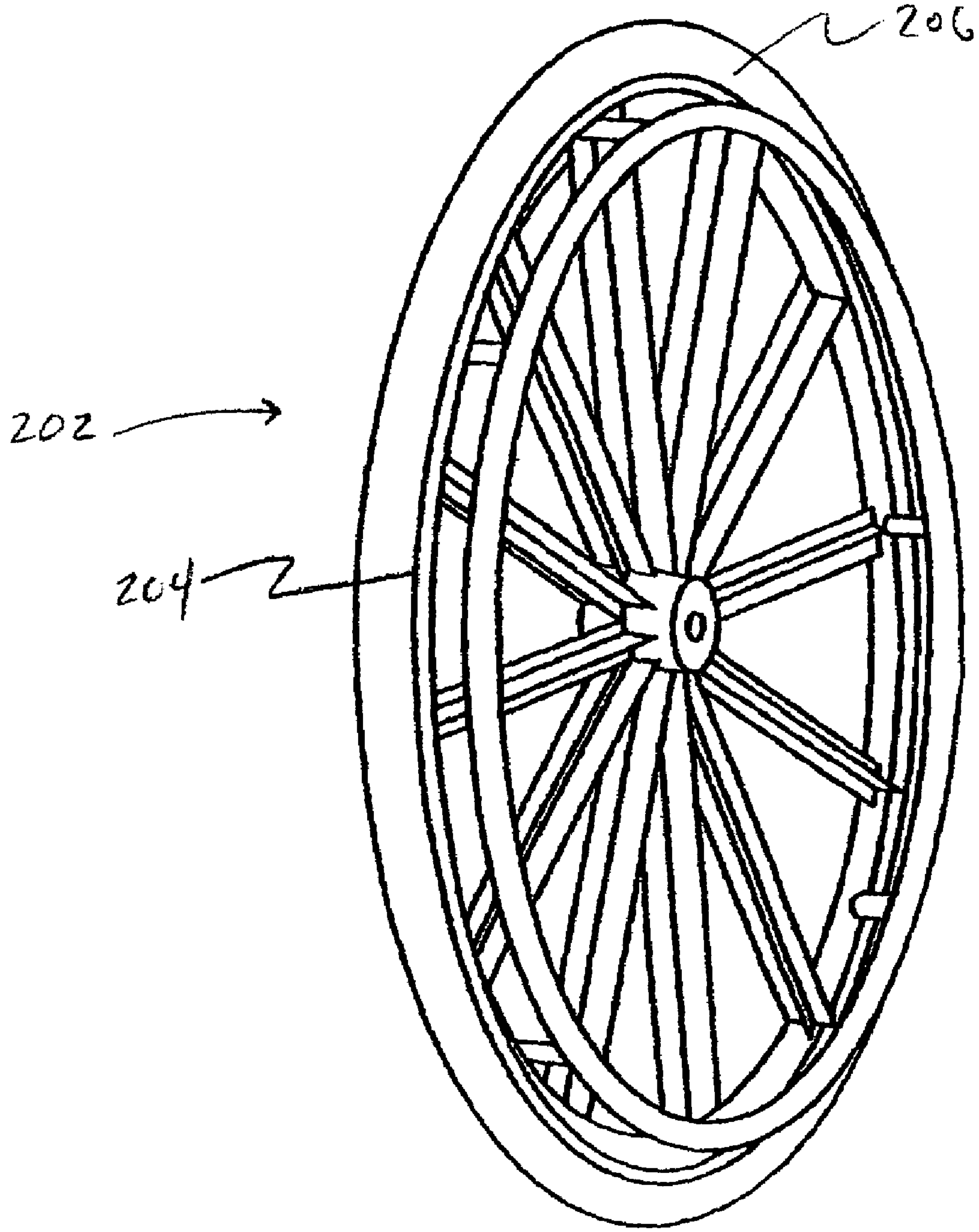
FIGURE 2 PRIOR ART
FIG. 2 is a perspective view of the prior art, a traditional wheelchair pushrim.

Referring to the figures, system 100 comprises pushrim 102 and insert 108 which can be connected to a wheelchair wheel 202 using connectors 104, as shown in FIG. 1. Typically, wheel 202 comprises an inner wheel rim 204 and tire 206, as shown in the prior art of FIG. 2. System 100 can be manufactured to fit any size wheel 202, including the most common sizes between 21 inches and 26 inches in diameter.

Figure 3:
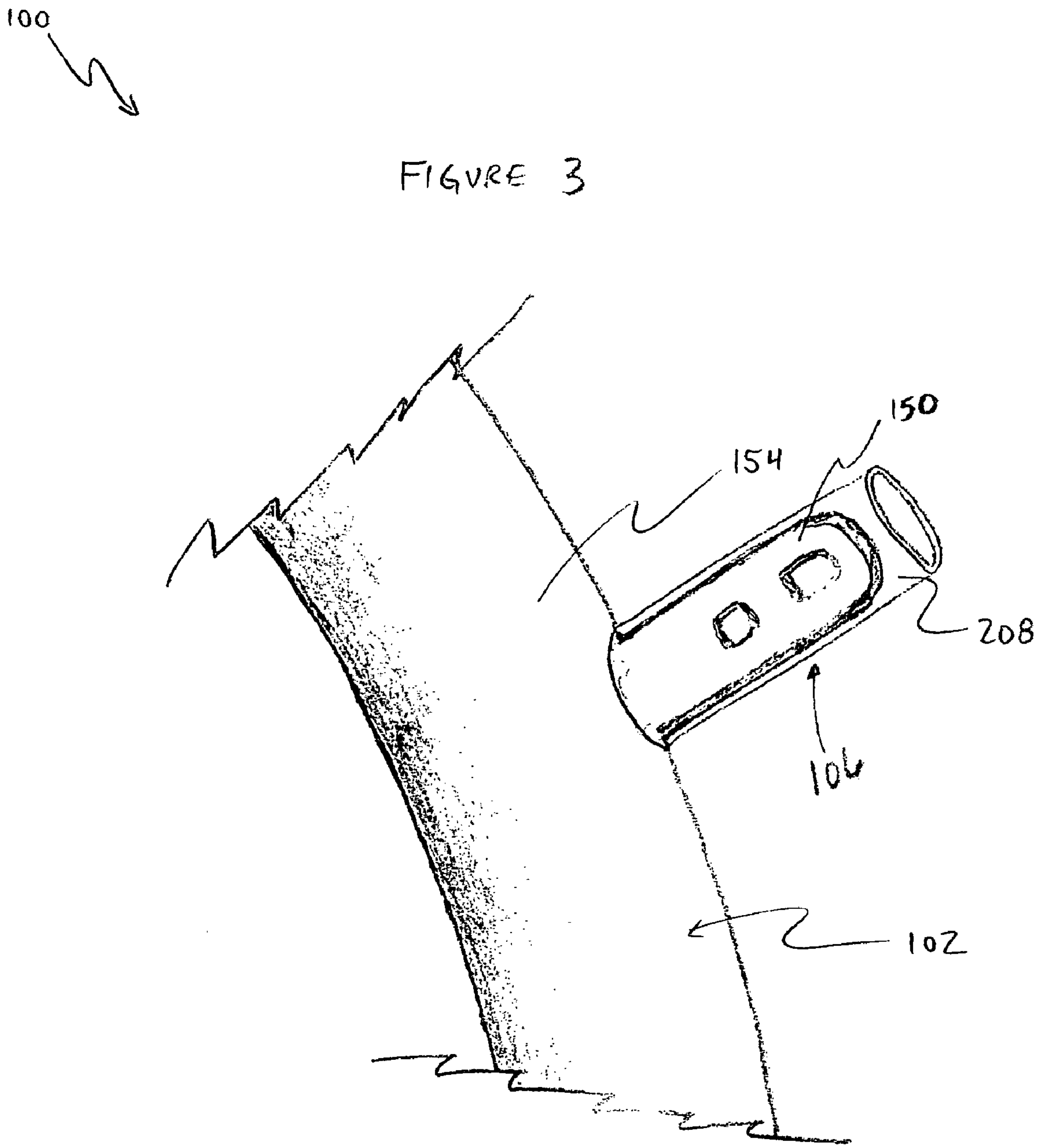
FIG. 3 is a perspective view of a connector.

Connectors 104 preferably utilize a tab mount 106 configuration. Tab mounts 106 are protrusions on the interior circumference surface of the pushrim 102 which extend perpendicularly from the plane of pushrim 102. Tab mounts 106 are attached to the wheel rim 204, preferably with screws 152. Preferably, connectors 104 utilize sleeves 208, which are tubes, preferably plastic or some other soft material, which slide on to the tab mounts 106, as shown in FIG. 3. Sleeves 208 serve to protect users from injuring themselves on tab mounts 106, as well as tightening the fit between the screws 152, protrusions 150, and wheel 202. Tab mounts 106 are preferably made of the same material as the pushrim.

Figure 4:
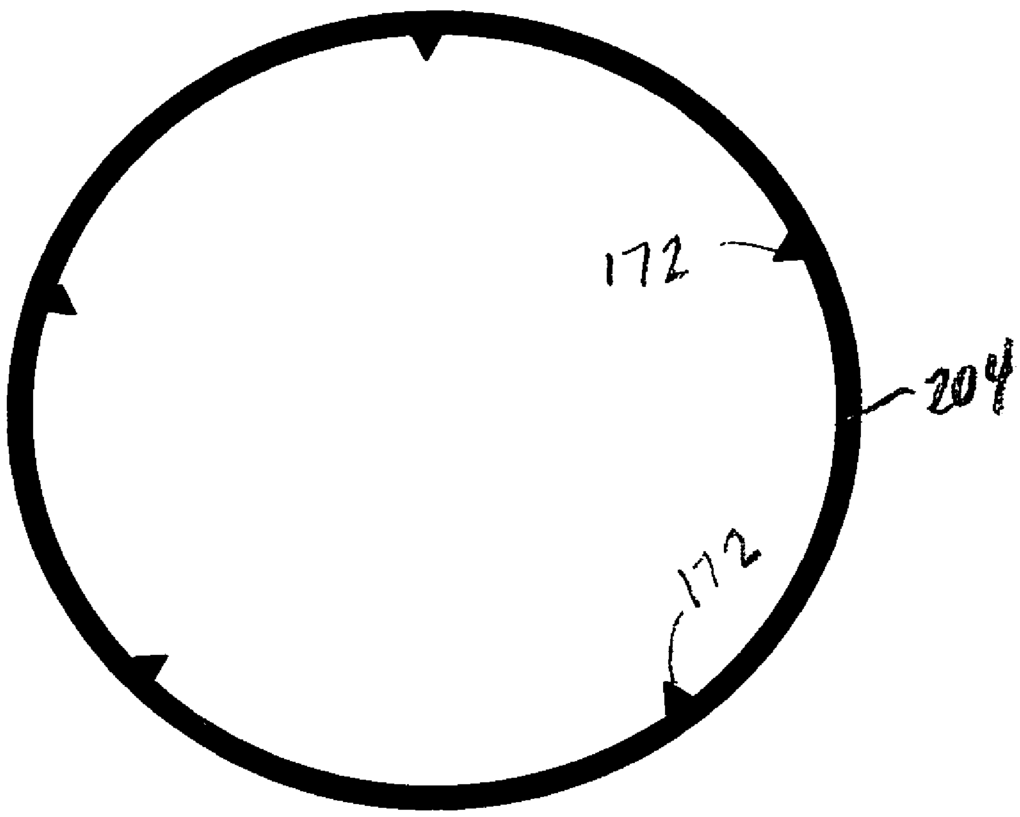
FIG. 4 is a front view of a wheel rim used with an alternative connector.

Alternatively, rivet-nut mounts may be used to attach the pushrim 102 to the wheel rim 204. See FIG. 4. The wheel rim 204 has one or more flanges 172 that extend inwardly in the plane of the wheel rim. Each flange may have a hole (not shown) for receiving a rivet-nut. The pushrim 102 is attached to the wheel rim 204 by inserting a rivet-nut through the pushrim and the flange 172. A spacer may be used between the pushrim and the wheel rim. Alternatively, screws or bolts may be used to attach the pushrim 102 to the wheel rim 204.

Figure 5:
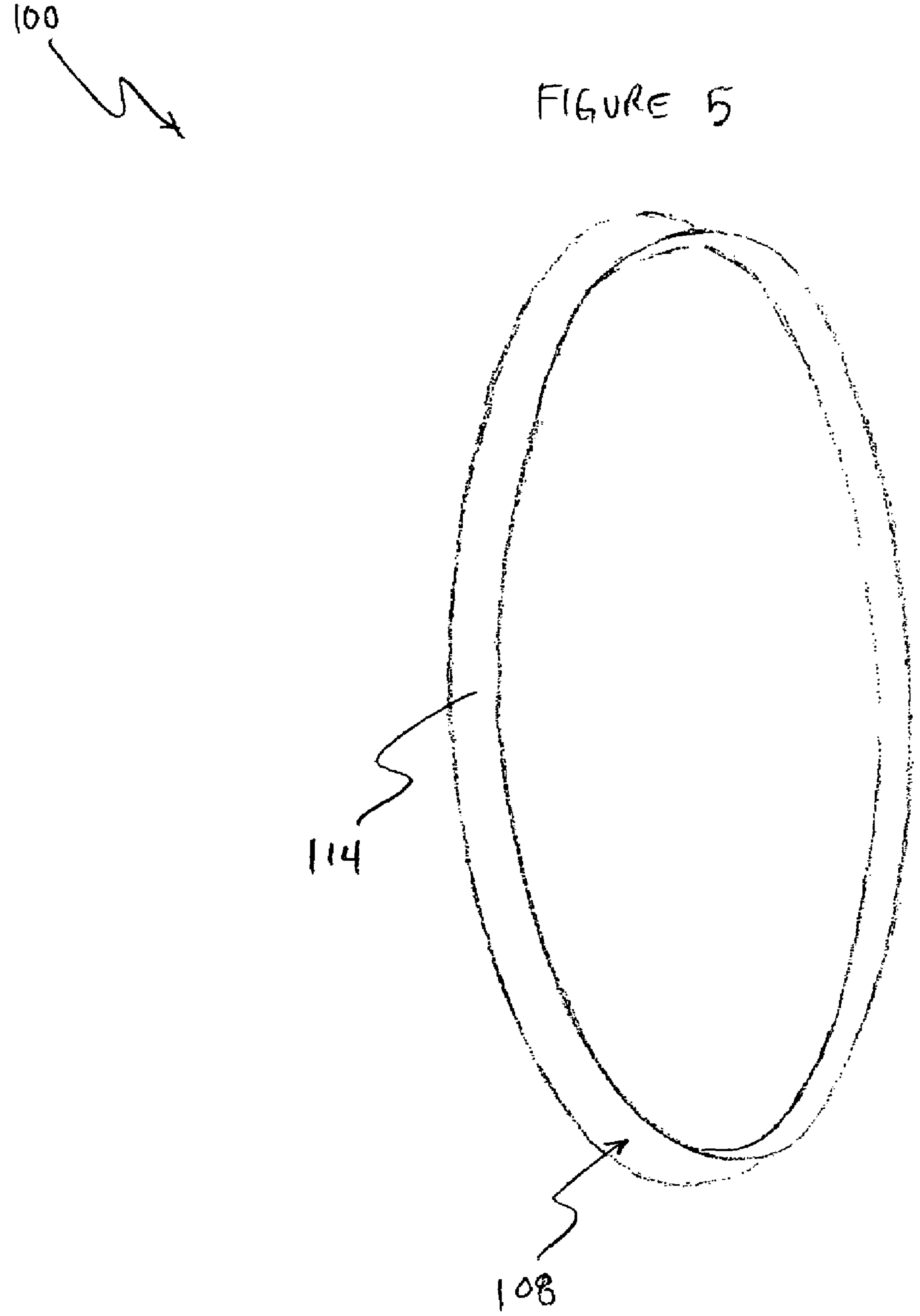
FIG. 5 is a perspective view of the insert.
Figure 6:
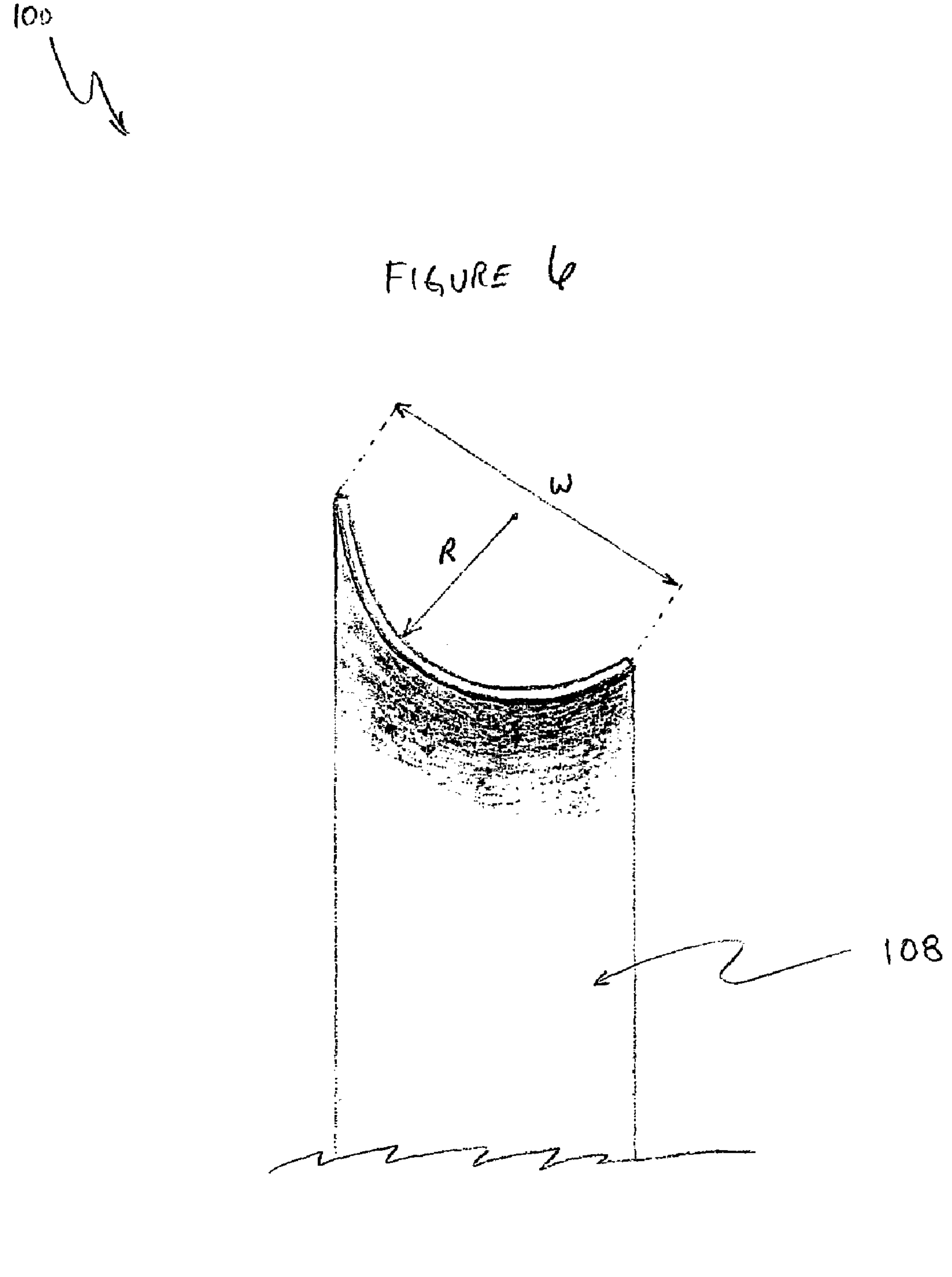
FIG. 6 is a cross-sectional view of the insert.
Figure 7:
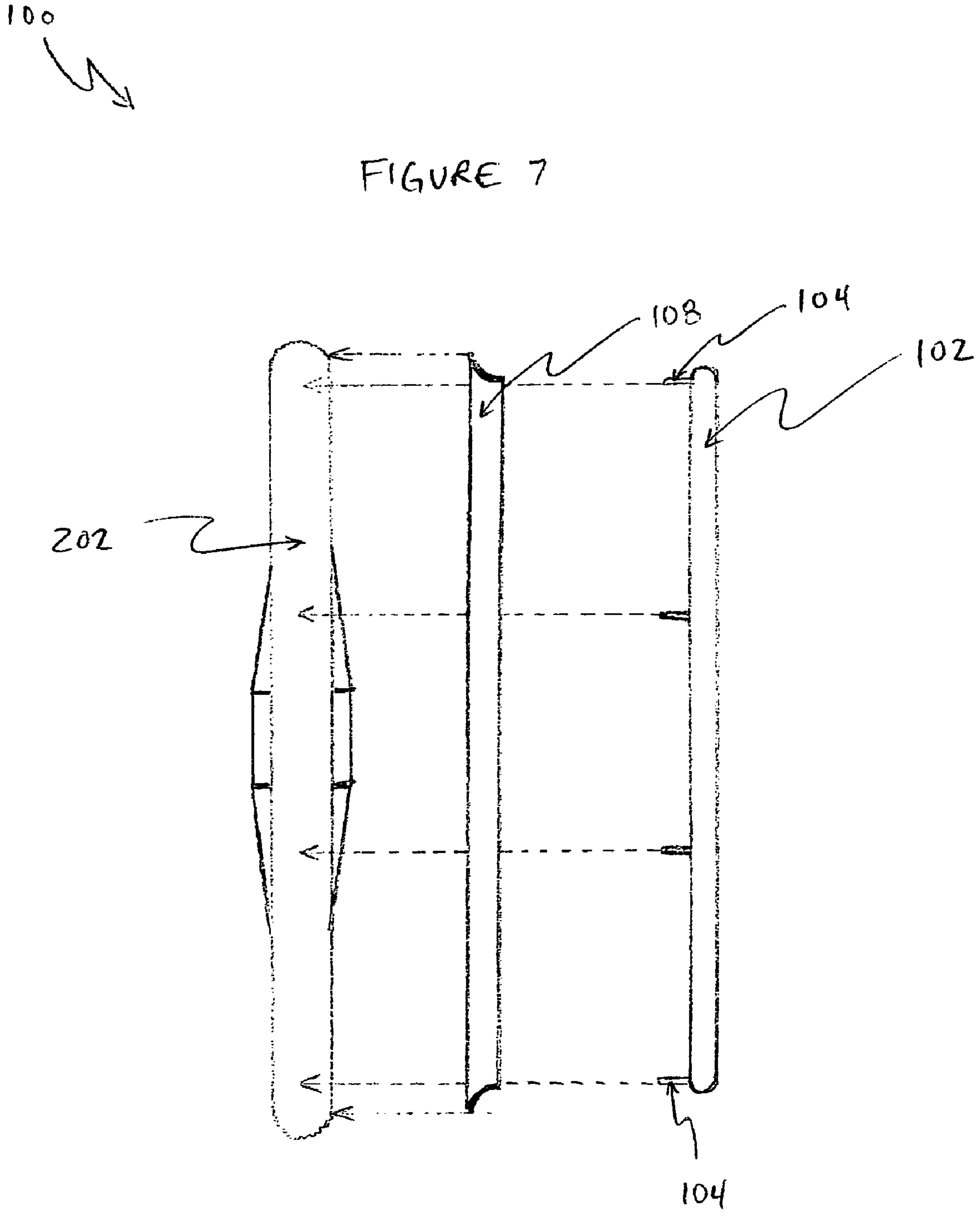
FIG. 7 is an exploded side-view assembly diagram of the wheelchair pushrim system.

FIG. 5 shows the insert 108. Insert 108 is made of an elastic material, preferably aluminum coated with a reinforced polyester such as neoprene or PVC, specifically a polyester sold under the brand name PLASTISOL™. Insert 108 is contoured, and preferably shaped as a concave trough to accommodate the shape of a thumb. Preferably, the concave trough has a radius R of about 0.375 inches, and a direct width W of about 0.875 inches, as shown in FIG. 6. Insert 108 stretches and compresses around protrusions 150, providing for ease of assembly and self-centering, as shown FIG. 7. Insert 108 should fit snugly between pushrim 102 and wheel 202, with a smooth transition between the edge of the insert and both pushrim 102 and wheel 202, as shown in FIG. 1. Under appropriate circumstances, considering issues such as cost, manufacturing, wheelchair user preference, etc., other materials may be used for the inserts 108, such PVC or metal. And, while a concave shape is preferred, the insert may also be substantially flat or otherwise contoured to other portions of the hand.

Figure 8:
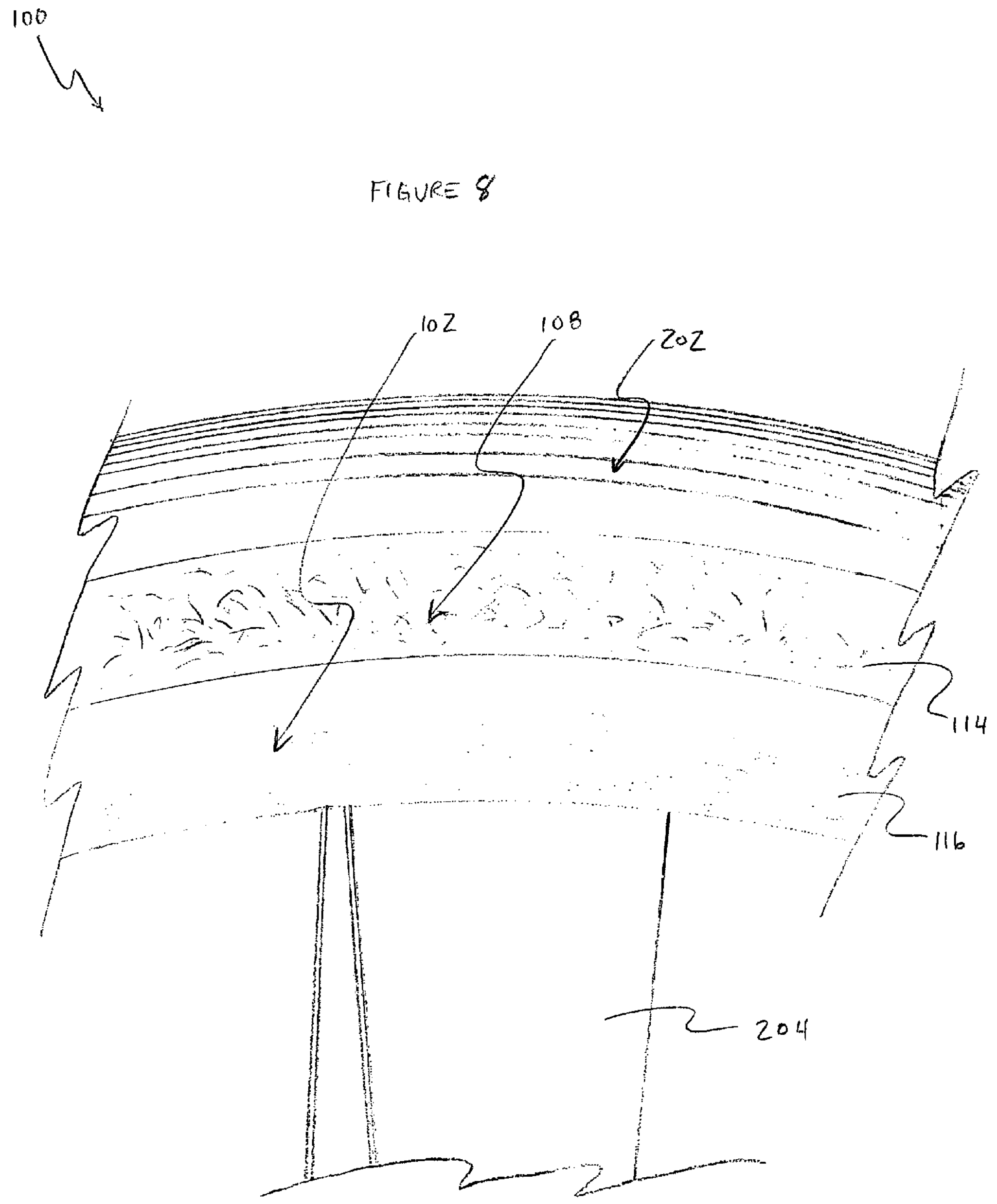
FIG. 8 is a close-up perspective view of the smooth and gripping textures of the wheelchair pushrim system.

Insert 108 has a gripping texture 114, which provides for improved pushing, as shown in FIG. 8. Gripping texture 114 is preferably molded directly into the surface of the insert, but it may also be applied separately. For example, a spray-on coating, powder coating, neoprene, or other materials may suffice.

Figure 9:
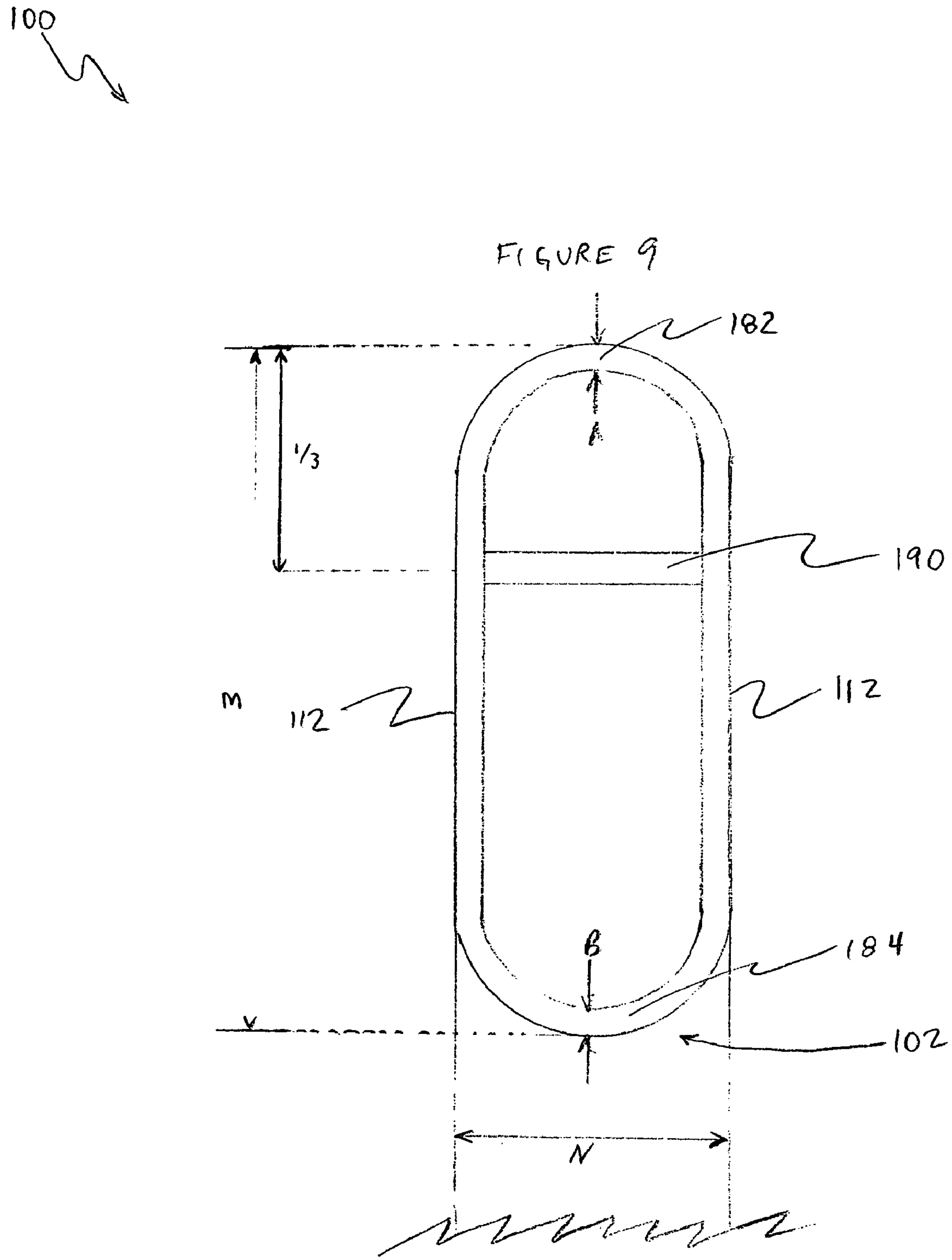
FIG. 9 is a cross-sectional view of the preferred embodiment of the pushrim.

The preferred pushrim is shown in FIG. 9. Pushrim 102 is preferably hollow and has an elongated circular cross-section. Alternatively, pushrim 102 may comprise an oval cross-section (not shown). Preferably, the cross-section of pushrim 102 is uniform around the circumference of pushrim 102, with a major diameter (or height) M of about 1.5 inches and a minor diameter (or width) N of about 0.75 inches. Preferably, pushrim 102 also utilizes a support rib 190. Support rib 190 is located at a radial distance about one third of the way inside the gap between the outer curved edge 182 and the inner curved edge 184. Under appropriate circumstances, considering issues such as cost, wheelchair user preference, manufacturing abilities, etc., other pushrim 102 configurations, such as ribbed contours, contours matching the human hand, contours for disabled wheelchair users, non-uniform cross-sections, cross-sections of other shapes, etc., may suffice.

Pushrim 102 has a substantially smooth texture 116, which provides for improved braking. Preferably, smooth texture 116 is achieved by using polished aluminum. Because pushrim 102 has a substantially flat side 112 which provides for increased surface area, braking friction is more broadly distributed across the hand, reducing heat and the risk of injury. Under appropriate circumstances, considering issues such as cost, manufacturing, materials technology, etc., other smooth textures 116, such as other polished materials, spray-on surfaces, powder coating, surfaces treated in ways other than polishing, materials other than aluminum, etc., may suffice. Under some circumstances, system 100 may be altered to accommodate different disabilities. For example, a neoprene coating may be used in place of smooth texture 116, for improving the propulsion and braking ability for those users where hand function and gripping capability are limited.

Figure 10:
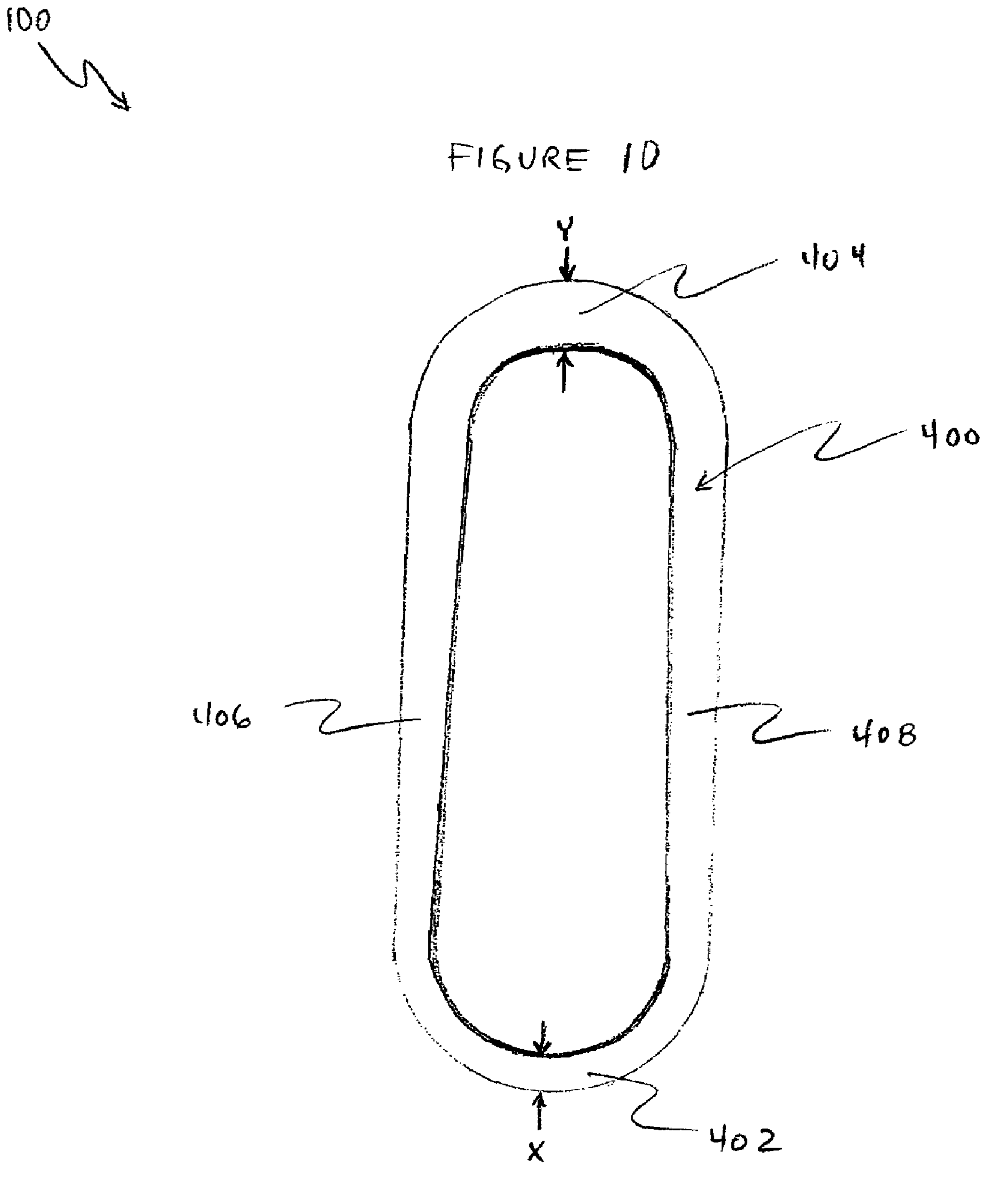
FIG. 10 is a cross-section of one embodiment of the hollow tube, prior to bending.

Pushrim 102 can be extruded from a single piece of metal. This method involves extruding a substantially hollow tube of metal and bending it into a circular shape, forming a pushrim 400. The cross-section of the hollow tube comprises a first round end 402, a second round end 404, a substantially flat first side 406, and a substantially flat second side 408, as shown in FIG. 10. Upon bending, the first round end 404 becomes the inside diameter of pushrim 400. The pre-bending wall thickness of first round end 402 should be greater than the pre-bending wall thickness Y of the second round end 404. The post-bending wall thickness A of first round end 402 should be about equal to the post-bending wall thickness B of the second round end 404. In the preferred embodiment, both A and B are about 0.05 inches to about 0.06 inches. Similarly, the portions of first side 406 and second side 408 that are closest to second round end 404, could also have a greater pre-bending thickness than the portions of first side 406 and second side 408 that are closest to first round end 402. A support rib 410 across the hollow interior of the tube may also be utilized for increasing the strength of pushrim 400. To create the pushrim from the extruded tube, the first cut end of the extruded tube and the second cut end are attached, preferably by welding.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the spirit and scope of the appended claims.

We claim:

1. A wheelchair pushrim system comprising:

a) a pushrim;

b) a wheel connected to the pushrim, wherein the pushrim has:

i. an elongated circular cross-section; and ii. a support rib;

c) an insert compressibly fit between the pushrim and the wheel, wherein the insert:

i. is made of a substantially elastic material;

ii. is a concave trough; and iii. has a gripping texture.

2. The system of claim 1 wherein the insert is coated with neoprene.

3. A wheelchair pushrim system comprising:

a) a pushrim;

b) a wheel connected to the pushrim; and c) an insert compressibly fit between the pushrim arid the wheel;

wherein the insert is a concave trough and is made of a substantially elastic material.

4. A wheelchair pushrim system comprising:

a) a pushrim;

b) a wheel connected to the pushrim; and c) an insert compressibly fit between the pushrim and the wheel;

wherein the pushrim is substantially hollow and further comprises at least one rib which improves structural strength.

5. A wheelchair pushrim system comprising:

a) a pushrim having a non-circular cross-section;

b) a wheel;

c) a connector connecting the pushrim to the wheel; and d) an insert fit between the pushrim and the wheel;

wherein the pushrim further comprises at least one support rib.

* * * * *